US005531146A

United States Patent [19]

Pederson

[11] Patent Number: 5,531,146

[45] Date of Patent: Jul. 2, 1996

[54] TIRE SHEAR

[76] Inventor: Les H. Pederson, 2612 W. Sixth St., Sioux City, Iowa 51103

[21] Appl. No.: 310,964

[22] Filed: Sep. 23, 1994

Related U.S. Application Data

[63] Continuation-in-part of Ser. No. 856,247, Mar. 25, 1992, abandoned, and a continuation-in-part of Ser. No. 91,958, Jul. 15, 1993, abandoned.

[51] Int. Cl.[6] ............................ B26D 7/01; B23D 15/04

[52] U.S. Cl. ........................ 83/467.1; 83/609; 83/699.61; 83/824; 83/928; 83/951; 193/35 TE

[58] Field of Search ............................ 83/607, 608, 609, 83/175, 176, 467.1, 468.7, 923, 928, 951, 827, 699.51, 699.61, 694, 824; 193/35 R, 35 TE, 35 MD, 37; 241/DIG. 31

[56] References Cited

U.S. PATENT DOCUMENTS

| | | | |
|---|---|---|---|
| 2,110,047 | 3/1938 | Marofsky | 83/609 X |
| 2,622,720 | 12/1952 | Lorig | 193/37 X |
| 3,053,368 | 9/1962 | Klahn | 193/37 X |
| 3,090,270 | 5/1963 | Rhodes et al. | 83/601 |
| 3,170,357 | 2/1965 | Ridgway | 83/608 |
| 3,279,295 | 10/1966 | Teplitz | 83/694 X |
| 3,387,523 | 6/1968 | Pray | 83/461 |
| 3,552,541 | 1/1971 | Riggs | 193/37 X |
| 3,731,577 | 5/1973 | Swint, Jr. | 83/609 X |
| 3,911,772 | 10/1975 | Kisielewski | 83/278 |
| 3,922,942 | 12/1975 | Fawcett et al. | 83/620 |
| 4,338,839 | 7/1982 | Farrell, Sr. et al. | 83/620 |
| 4,338,840 | 7/1982 | Farrell, Sr. et al. | 83/923 X |
| 4,476,760 | 10/1984 | Block et al. | 83/694 X |

FOREIGN PATENT DOCUMENTS

| | | | |
|---|---|---|---|
| 2531923 | 2/1977 | Germany | 83/175 |
| 2644015 | 4/1978 | Germany | 83/699.61 |

*Primary Examiner*—Rinaldi I. Rada
*Assistant Examiner*—Clark F. Dexter

[57] ABSTRACT

A tire cutting machine including a fixed cutting blade and a movable cutting blade, the machine being adapted to cut by shearing action. The movable blade is guided by adjustable guides at each end of the blade to provide very close proximity of the blades and to maintain proper clearance between the blades. The blades, in the open position, are spaced apart at both ends to provide an open throat allowing placement of the tire to be cut in a position relatively close to the pivot point between the blades for better leverage in the cutting process, so that varied sizes of tires for all types of conveyances may be easily cut. Loading and disposal devices are also used with the machine for easier handling. A special tire or wheel holding device is also provided to hold the tire in place as it is being cut.

2 Claims, 8 Drawing Sheets

TIRE SHEAR

BACKGROUND AND SUMMARY OF THE INVENTION

This is a second continuation in part of my prior application, Ser. No. 07/856,247, filed Mar. 25, 1992, and Ser. No. 08/091,958, filed Jul. 15, 1993, both applications now abandoned, and relates to a device for reducing the size and shape of waste tires by cutting them into radial segments of their original circular shape and with capacity to further cut those radial cut tire segments circumferential to that original circular shape. The blades are held in proper shearing relationship to each other by adjustable blade guides which will account for wear and shearing adjustment.

Waste tires are known to create environmental hazards when stored either in out-of-doors piles or in enclosed buildings. Such stored tires, if out of doors, hold large quantities of accumulated rain water and create breeding grounds for mosquitos, rats, and other disease carrying vermin. Large quantities of stored tires, in or out of doors are a potential fire hazard which if ignited purposely, accidentally or by act of God can seriously harm the environment with hydro-carbon pollutants.

Whole tires disposed of in landfills are known to hydro-float to the soil surface, often after months or years of soil impoundment.

Governmental agencies are now requiring that waste tires, either be processed for recyclable use or be reduced in total volume by cutting, chopping or shredding to provide for deposit of tires in a landfill with reduced likelihood of hydro-flotation and to reduce the volume of landfill space required for tire disposal.

The object of this invention is to provide a sturdy, efficient, reasonably priced tire cutter which may be used by landfill operators including municipalities, together with custom operators, tire dealers, trash haulers and others to serve the need for safe, efficient tire disposal by cutting the tires into multiple segments for the intended end use or disposal. The device of the invention is also useable for cutting large tires into smaller pieces for more efficient operation of tire shredding machines. These machines may be proportioned to handle smaller pieces of tire when the tire is cut by the preset machine into small segments.

There have been, in the past, a number of devices for shearing tires in a direction radially of the tire. These devices are generally of two types. A first type uses a fixed blade and a second movable blade moving linearly in a direction substantially perpendicular to the cutting edge of the first blades similar to the action of a guillotine. Shearing action is achieved by sloping one of the two blades relative to the other.

In some instances, illustrated by the device of U.S. Pat. No. 4,338,839 to Farrell et al, and U.S. Pat. No. 3,922,942 to Fawcett et al, the blades are held in the substantial equivalent of a die set and are moved vertically by some sort of ram. In both instances, a great deal of surrounding structure is required to hold the blades in proper shearing position. Further, only a limited range of diameter of tires can be handled in each machine because each stroke shears the full diameter of the tire. Thus, the length of blade required would be prohibitively large to cut both a small diameter trailer tire or the large diameter tire from a large truck or even a farm tractor or heavy equipment tire with a single set of blades.

A second type of machine more nearly approaching that of applicants' is illustrated in U.S. Pat. No. 3,911,772 to Kisielewski. In this type of machine, one blade is pivotally mounted relative to the second blade. Applicants' device is an improvement of such a device in which, by the unique mounting of the blades relative to each other and the guides to control the lateral position of one blade relative to the other, the cutting efficiency and safety is greatly improved. Also, the device is improved by mounting the blade so that even at the narrowest part of the opening there is an open space for the tire to be placed nearer the fulcrum. This arrangement reduces the force necessary to drive the shear pivotally.

Applicants also provide a support and a loading device and a disposal device for tires being cut. These features are of increasing importance as the size of tire being cut is increased. It becomes virtually a necessity when large truck tires, farm tractor tires and tires for heavy equipment such as mining equipment are to be handled. Also for such tires, a retaining device adapted to hold the tire securely in place while it is being cut is provided. This retaining device may be used in combination with a special loader for such large tires.

The shear is strong enough and the adjunct device adequate so that many types of automobile wheels may also be cut so that tires do not have to be removed from the wheels before shearing. In the shearing process, the tire merely falls away from the metal wheels.

DESCRIPTION

Figure 2:
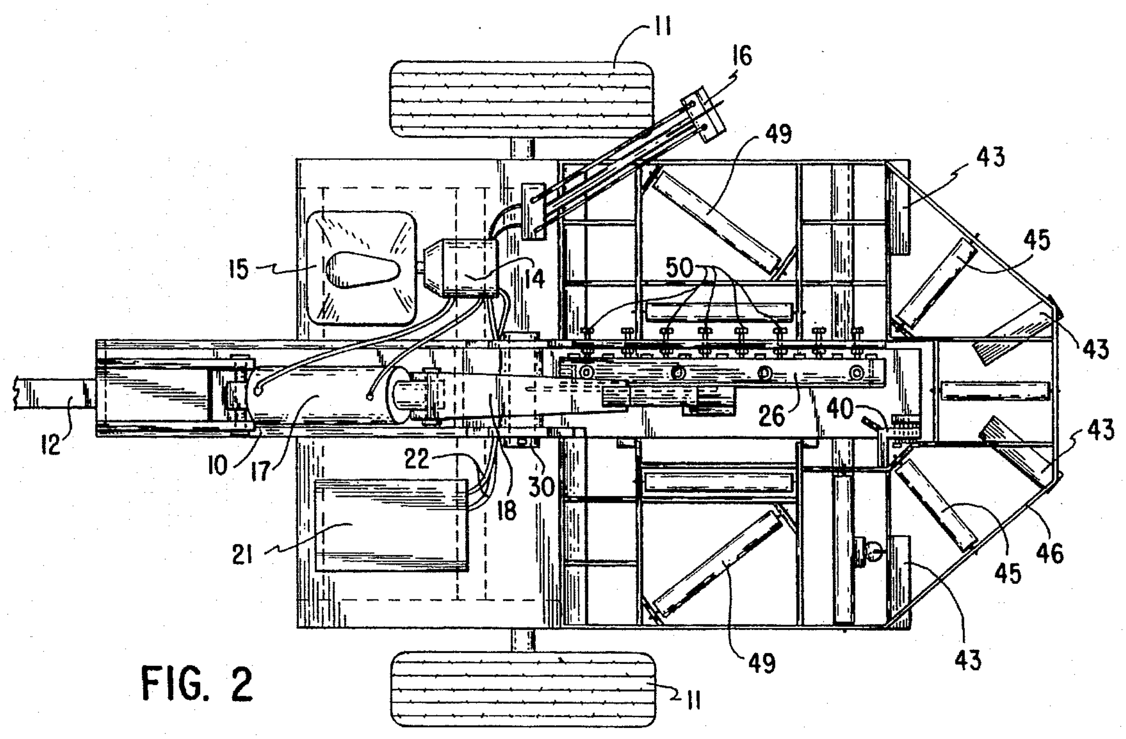
FIG. 2 is a top plan view of the cutter shown in FIG. 1, showing the support for large tires.

Broadly this invention comprises an improved shear-type cutter for tire casings in which one shear blade is held in close shearing relationship with the second blade; in which the throat near the pivotal axis between the blades is open to allow the casings to be placed near the pivotal axis for easier cutting, and in which support for holding the casings is conveniently combined with the shear to support large casings. Loading and disposal mechanisms are also provided.

More specifically and referring to the drawings, the device is designed to be portable and therefore includes a frame 10 mounted on wheels 11 and having a tongue 12 for convenient towing of the device from one location to another. It may be noted that the device may also be permanently mounted if desired without sacrificing any features except portability.

The actuating means for the shear includes hydraulic means and, therefore, the hydraulic pump 14 and its power supply which may include a small gasoline engine 15 are mounted on the frame. Control means 16 is operably connected to the pump 14 and is adapted to control the flow and pressure to hydraulic cylinders 17, 80 and 88 as will later be discussed. The cylinder 17 and its accompanying piston provides a hydraulic piston/cylinder assembly connected between the frame 10 and a bracket 18 engaged with the movable blade support 20. A reservoir 21 for replacement hydraulic oil may also be mounted on the frame 10 and have tubes 22 connecting it to the pump 14.

A stationary blade 25 is removably mounted on a blade backing member 26 (FIGS. 5 and 6) mounted on the frame 10. This blade is fixed in position and is rigidly held by the backing member. The blade backing member 26 is laterally adjustable for cutting proximity and clearance, as will later appear. Preferably the blade 25 is bolted to or fastened by machine screws to its backing member.

The vertically movable shear blade 28 is similarly mounted on the blade support 20 in position to shear with the lower blade 25. That position is preferably not with the blades in contact with each other, but still close enough to cause shearing action. The actual gap is of the order of a few thousandths of an inch. By the removable mounting, it is possible to provide sharp edges on each corner of each blade so that the blades may be reversed for use of a fresh cutting edge.

Figure 6:
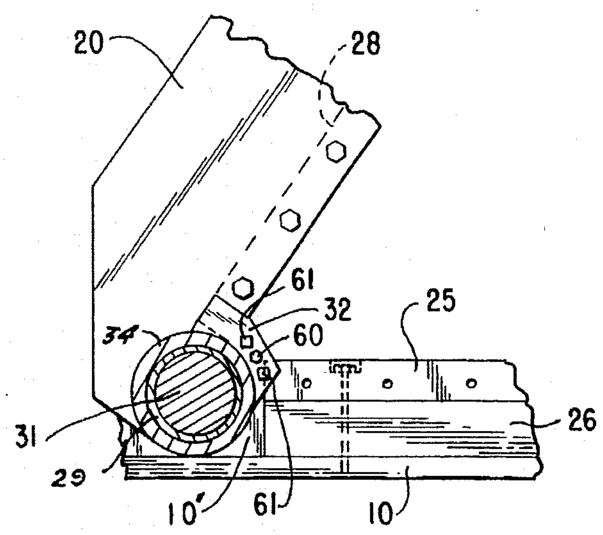
FIG. 6 is a view from line 6—6 of FIG. 5.
Figure 5:
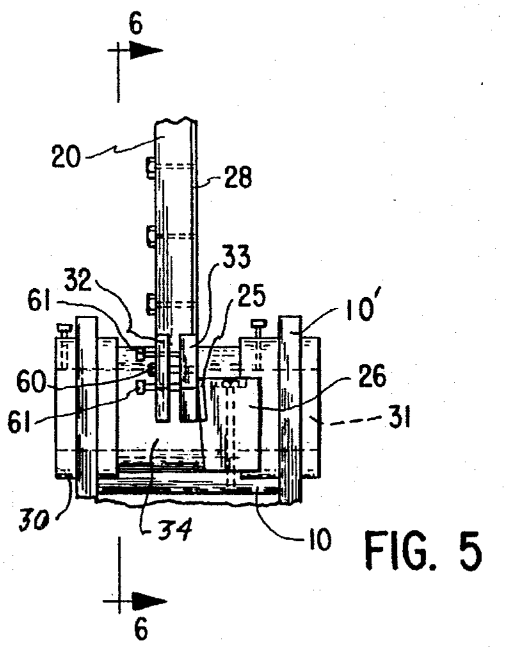
FIG. 5 is a partial end elevational view of the inner ends of the blades showing the inner guide.
Figure 3:
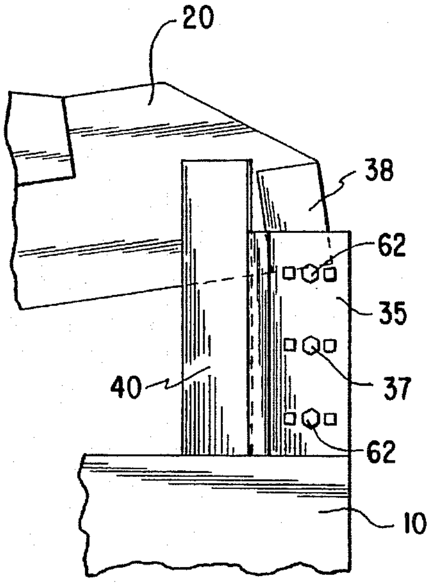
FIG. 3 is a detailed side elevational view of the outer end of the shear blades showing the outer guide.
Figure 4:
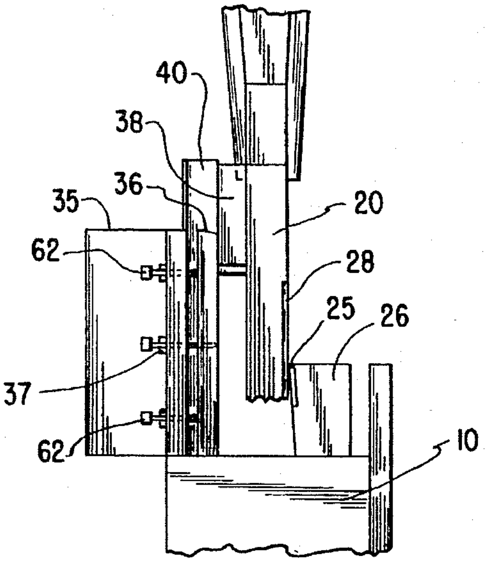
FIG. 4 is an end elevational view of the parts shown in FIG. 3.

Because this device is used to shear relatively large tires having tread width of about three feet and diameters of about eight feet as well as smaller tires, provision is made to accommodate large pressures on the blades, and to provide for wide opening of the jaws. The opening of the jaws is best illustrated in FIGS. 5 and 6 where the pivoting means is shown. The movable support 20 includes a slightly offset hub 34 which extends beneath the blade 28. A bushing 29 is pressed into the hub and is journalled on a pin 31. This pin or pivot axle 31 extends through ears 10' on the frame 10 and is retained there by the retaining ring 30. Thus, the movable support 20 can carry the blade 28 in a pivotal shearing motion relative to the stationary blade 25 about the axle 31.

The cutting edge of the blade 28 is on a line slightly above a radial line of the axle 31. Therefore, it allows some gap between the blades when it is raised. The upper movable blade 28 also does not extend to the axle, but instead is spaced from the pivot axle by some distance so that a tire to be cut can be moved between the blades some distance into a throat area defined by the blades and a heel 32 formed as a part of the support 20, or fixed to the support.

Adjustably attached to the heel 32 is an inner guide plate 33. This plate is held to the heel by a cap screw 60 extending through the heel and threaded into the plate 33. A pair of machine screws 61 are threaded into the heel and abut the plate 33 so that between the pull of the cap screw 60 and the push of the machine screws 61, the guide plate 33 is adjustable toward and away from the heel. Because the support 20 is pivotally mounted on the axle 31 and the inner guide plate 33 is fixed to the heel 32 which is a part of the support 20, the plate 33 is carried pivotally around that axle 31.

The guide plate is located so that it slides against the blade 25. The desired position is a close sliding fit so that the blade 28 never interferes with or hits the edge of the lower blade 25. The danger arises from the possibility of the positioning of the blade 25 too far toward the upper blade 28. If that happened then, rather than shearing past each other, the edges of the two blades would meet. That same condition might arise from a wearing in the pivotal mounting of the upper blade between the ears 10' to allow slight axial movement of the upper blade support 20 on the axle 31. Any axial movement of that sort would either destroy effective shearing by allowing too much space between the blades or would allow interference between the blades with one impacting the other. With the forces generated in the machine, such interference could create serious damage.

At the outer end of the blade 28 and support 20, an even more prevalent danger is that the gap between blades will be too great. Without guidance, that would be true even though the support 20 and the axle 31 are relatively heavy. Slight wear on the axle and even slight flexure of the support may well result in a gap of several thousandths or even a few hundredths of an inch at the outer end of the blades. Because of that, a guide system in that location is also desirable.

In the present device, that guide system includes a bracket 35 rigidly fixed to the frame 10. A hardened guide plate 36 is adjustably fastened to the bracket 35 so that it can be adjusted toward or away from the blade 25 in the same way as the inner guide plate 33. The cap screw 37 is threaded into the hardened steel plate 36 while machine screws 62 press against it. Thus, the plate 38 is mounted in position on the support member 20 and is adapted to engage the guide plate 36 as the member 20 comes downward in a shearing motion so that if there is any slight misalignment, the engagement of the plates 36 and 38 will cause a correction to hold the blades 25 and 28 in close relationship. To that end, the corners of the plates 36 and 38 may be slightly rounded or chamfered to avoid direct interference. Because any possible misalignment will be small, such rounding or chamfering may be relatively small. The exact amount required may be determined dependent on the usage of the machine. For example, there will be more side force encountered in cutting large tires than with ordinary automobile tires.

Figure 11:
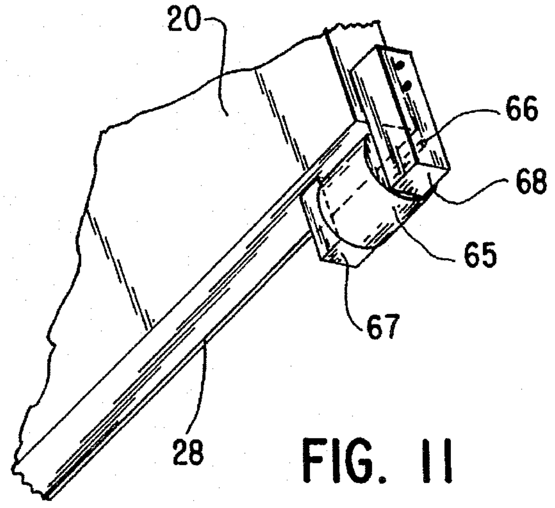
FIG. 11 is a detailed view of the outer end of the upper blade support showing an alternative device to make the outer guide more efficient.
Figure 14:
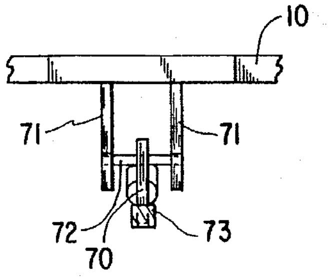
FIG. 14 is a sectional view from line 14—14 of FIG. 13.

As an alternative, useful with the larger units of this type of shearing device, the upper blade support 20 may be provided with a roller 65 journalled on an axle 66 extending between a block 67 mounted on the support 20 and an end plate 68 also attached to the support 20 (FIG. 11). This roller is in position to engage the outer guide plate 36 so that the same guiding action is available as in the sliding plates previously described. However, with the reduced friction between the plate 36 and the roller 65 as opposed to the plate 38, the power available is more usefully applied to the shearing action.

Figure 7:
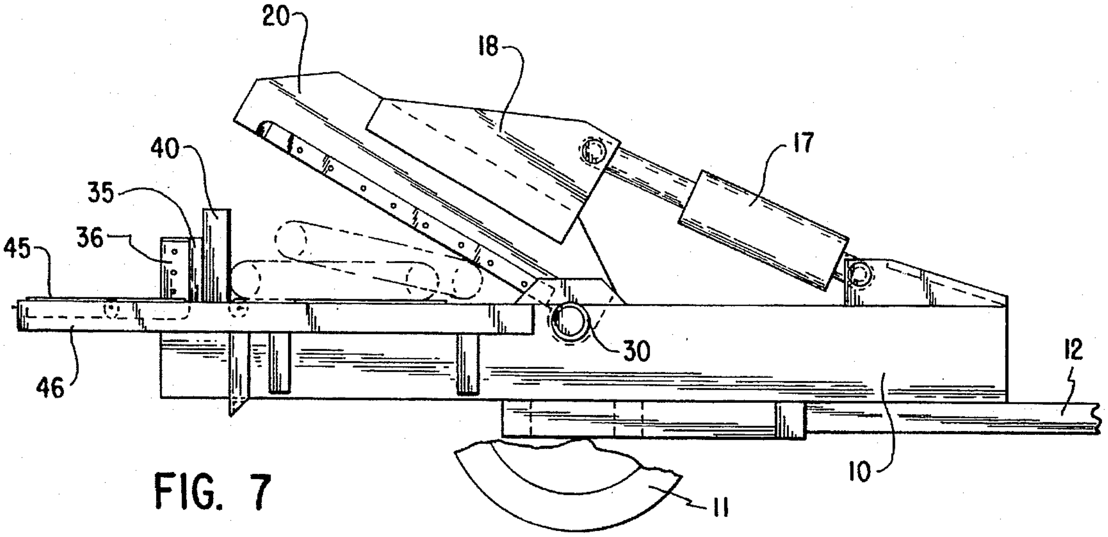
FIG. 7 is a side elevational view of the cutter showing a holding stop in place and illustrating cutting multiple small tires with a single cut.

A support post 40 may also be mounted on the frame 10. This post may provide a holding device to keep smaller tires from moving away from the cutting blades. In the cutting of very small tires as shown in FIG. 7, two tires may be cut at once, in which case, the post 40 may hold the lower tire. With larger tires, this post or similar stop becomes a necessity.

Figure 8:
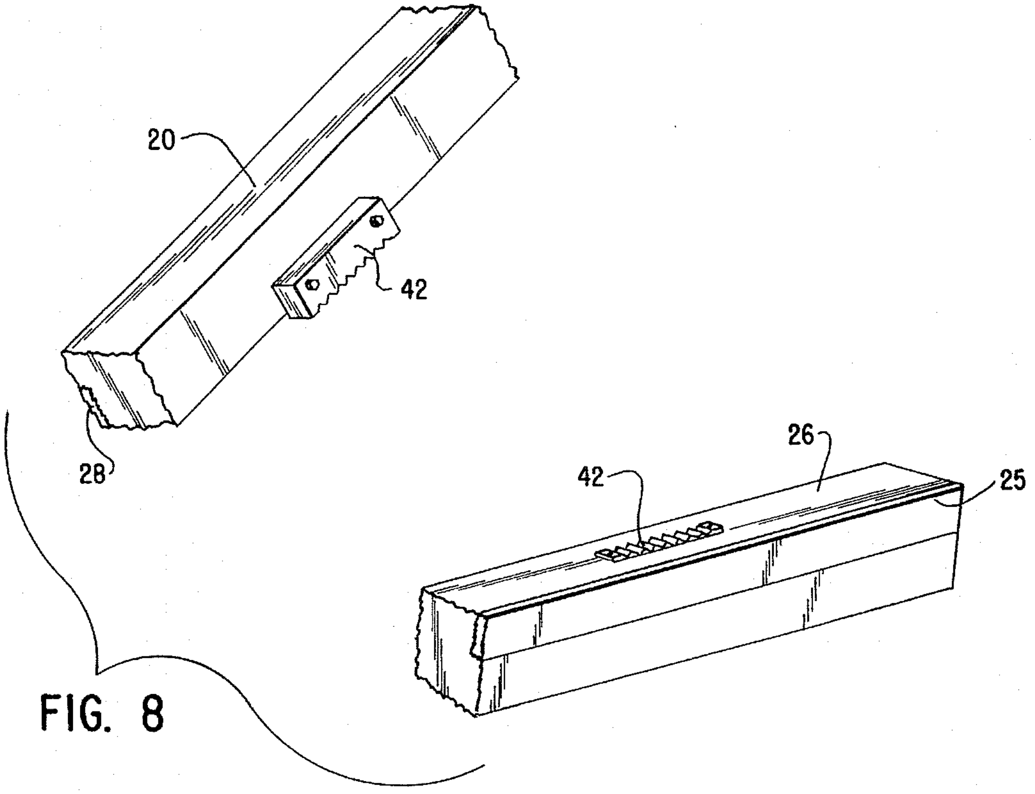
FIG. 8 is a view showing both blades isolated from the rest of the machine but showing tire holding devices for holding tires.

An alternative means which may be used alternatively or additionally for holding the tires in place is shown in FIG. 8. In this figure, the supports for the blades 25 and 28 are shown only diagrammatically. The holding means for holding the tires includes one or more serrated or toothed strips 42 mounted on either or both supports for the cutting blades. These strips are not in position to meet. They only need to be able to engage the side wall of the tire casing being cut. Because of that, the strips may be relatively long if a variety of tire sizes are anticipated or relatively short if all tires are expected to be of similar size.

Figure 1:
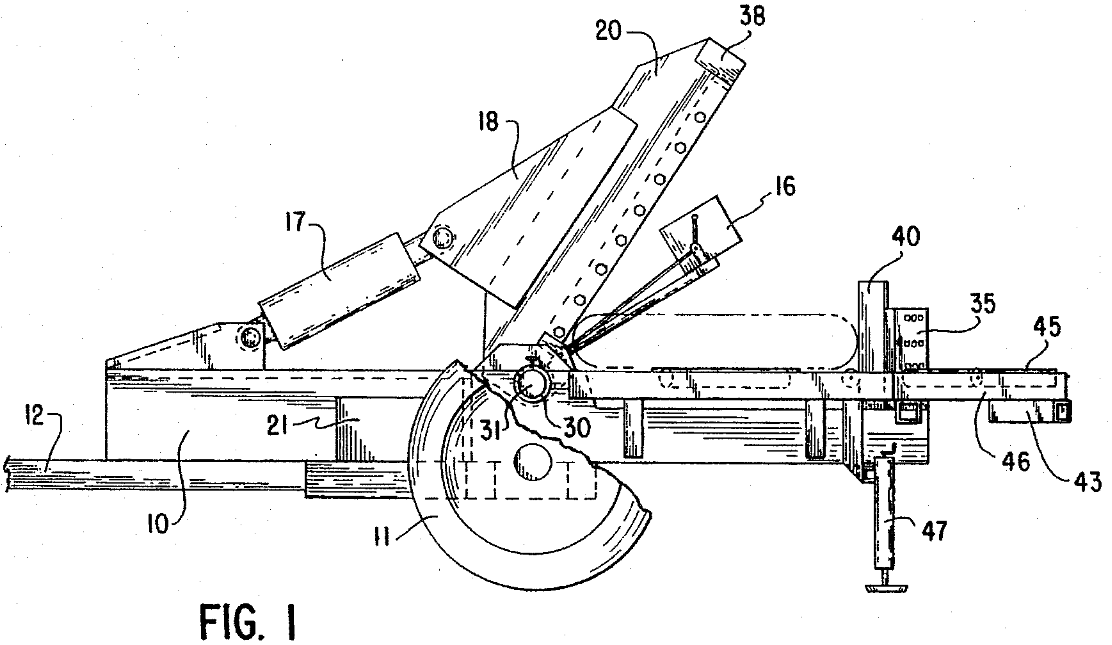
FIG. 1 is an elevational view of one embodiment of our invention.

Especially for larger sizes of tires, added support for the tire may be desirable. Although regular auto tires and smaller trailer and garden tractor tires may be wholly supported within the reach of the blades as shown in FIGS. 1 and 7, tires for large tractors or heavy equipment will not be thus accommodated unless the shear becomes unmanageably large. Thus, a support tray of some sort becomes desirable.

Figure 9:
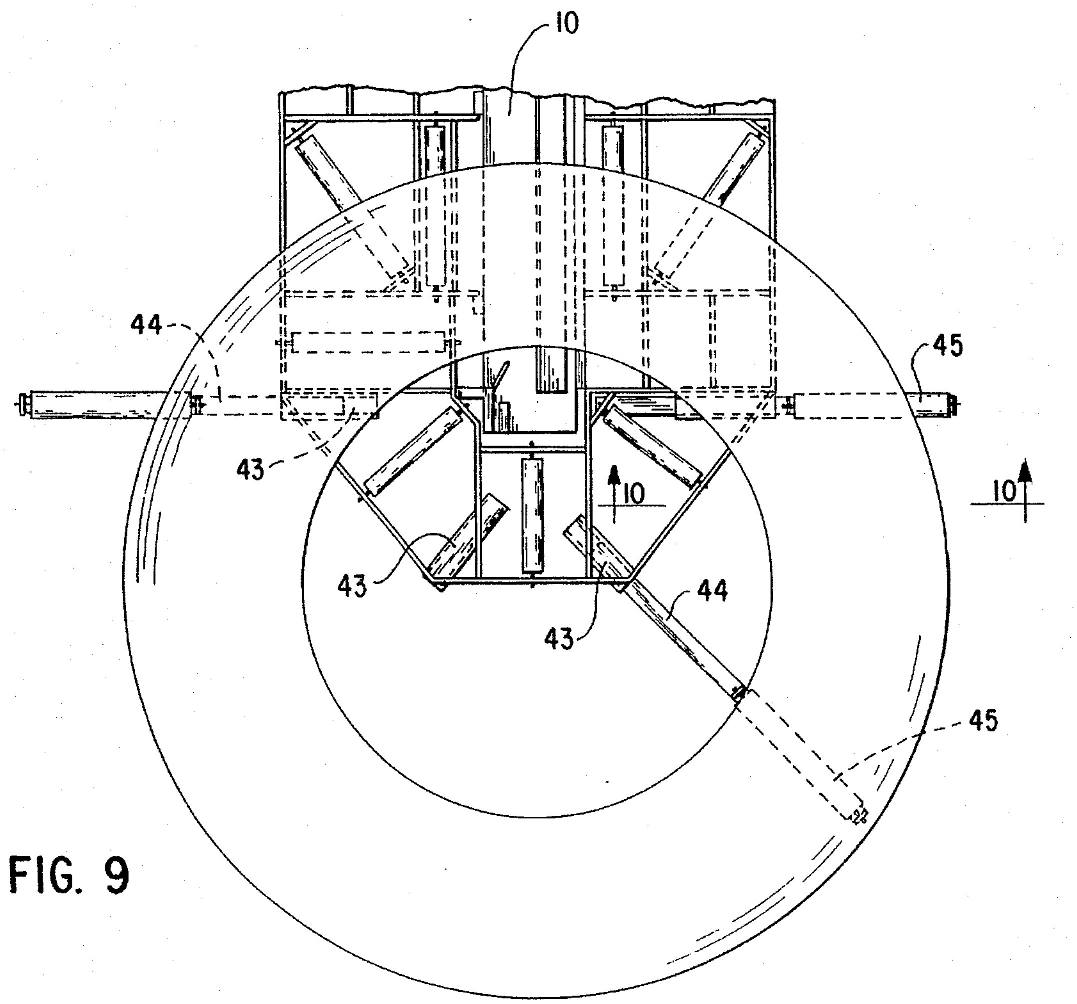
FIG. 9 is a top plan view of a support device for supporting large tires in place at the cutter.
Figure 10:
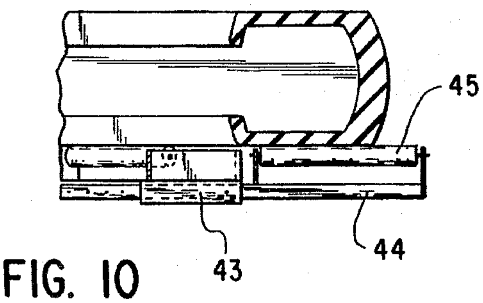
FIG. 10 is a detailed view of a tire lying on one roller of the support device.
Figure 12:
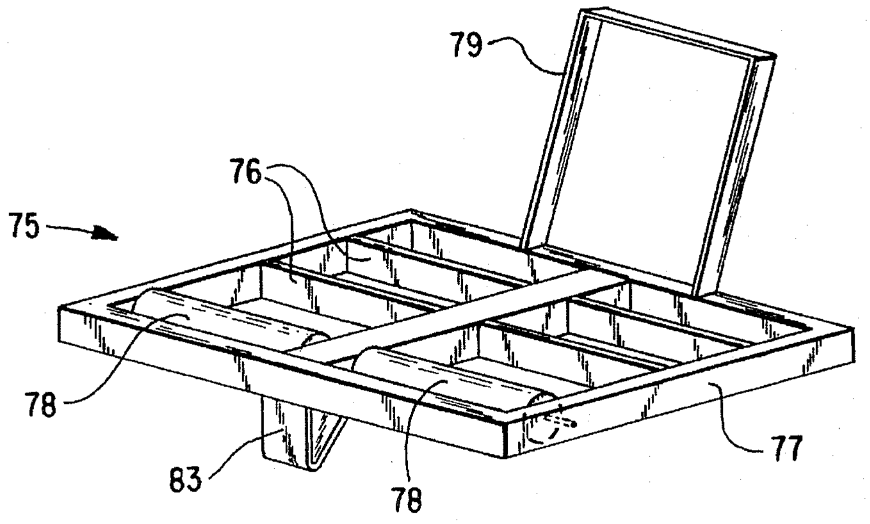
FIG. 12 is a perspective view of the tire loading rack, separate from the rest of the machine.

One desired form of support is shown in FIGS. 1 and 2 and in detail in FIGS. 9 and 10. The support consists primarily of a series of rollers 45 journalled on axles carried by a support frame 46. The frame 46 is, in turn, mounted on the original cutter frame 10. Additional support may be provided by a jack 47 (FIG. 1) which will also prevent tipping of the machine when heavy tires are laid on the support. It will be apparent that more rollers than shown may be provided and that the support frame 46 may be proportioned properly to accommodate the largest size of tire expected to be cut. Additionally, as shown in FIGS. 9 and 10, the rollers 45 may be journalled on extendible supports 44. Those supports telescope into sockets 43 mounted either on the frame 46 or directly on the main frame 10. Thus, the roller 45 may be completely withdrawn for smaller tires as shown in FIG. 9 on the right side, or extended as shown on the left side on that figure. It will also be apparent that one or more of the rollers may be power-driven if that is considered desirable for the very largest tires. In the event that a power driven roller is used, the exterior surface of the roller would be knurled for better frictional engagement with the tire to assure its rotation into position between the cutting blades.

Even tires somewhat smaller than the largest tires might be more easily handled with some roller support. Therefore, a pair of rollers 49 is provided on the frame 10 adjacent the backing member 26. Preferably there is a roller on each side of the lower blade. The rollers are illustrated with an axis at a substantial angle to the lower blade, but the angle is not critical. The desire is to provide convenient support for a tire so that it can be turned under the blades.

Figure 13:
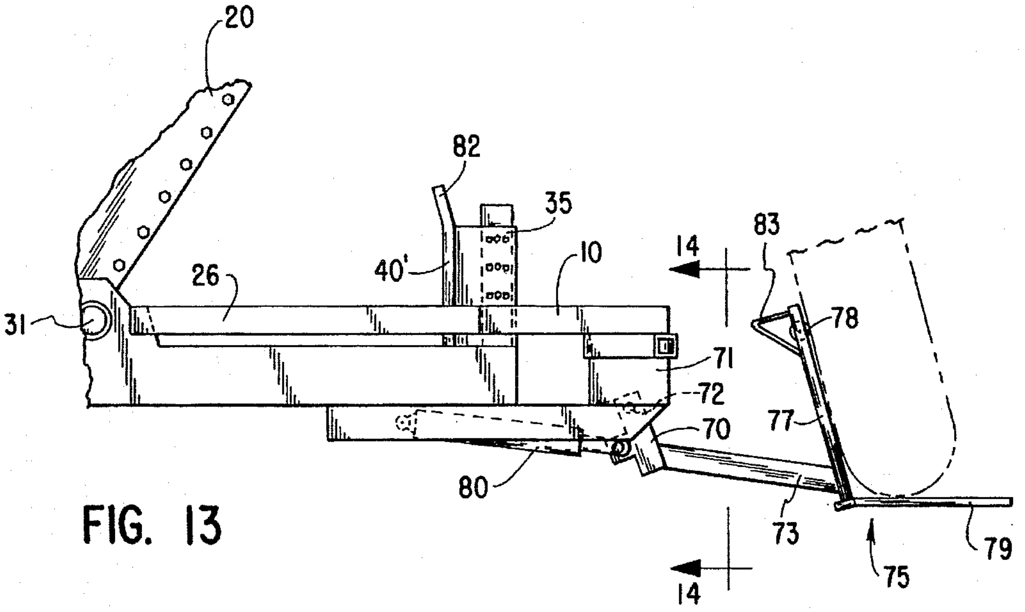
FIG. 13 is an elevational view of the loading device on the cutting device with a tire in place to be lifted.
Figure 15:
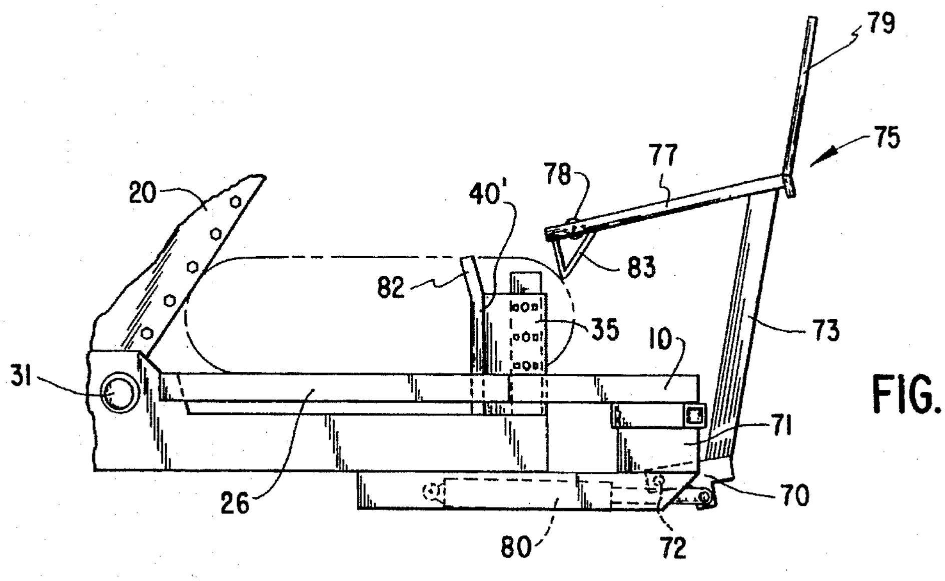
FIG. 15 is a view similar to FIG. 13 of the loading device with the tire lifted and in place.
Figure 16:
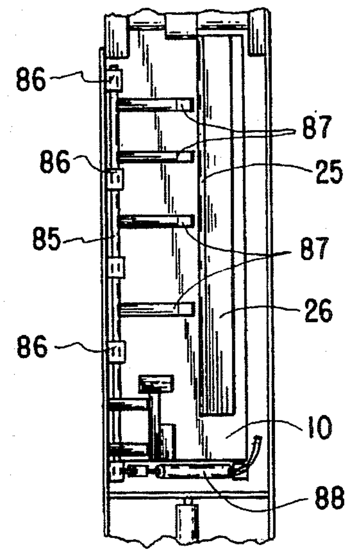
FIG. 16 is a top plan view of a device for removing cut pieces from the machine.
Figure 17:
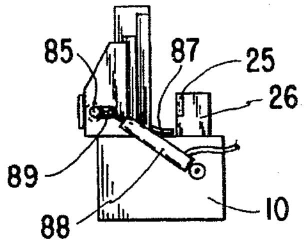
FIG. 17 is an end view of the device of FIG. 16 with the removing finger in position to receive cut pieces.
Figure 18:
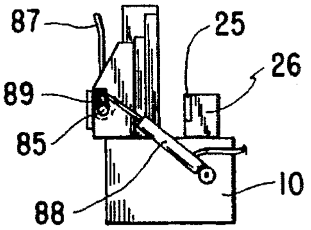
FIG. 18 is a view similar to FIG. 17 showing the fingers in the removal position.
Figure 19:
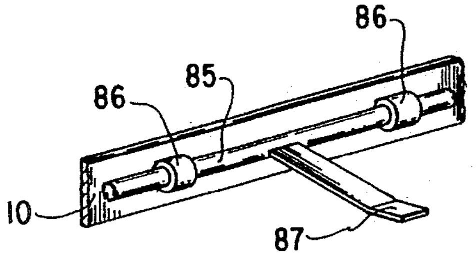
FIG. 19 is a perspective partial view showing one finger and its adjacent parts in detail.

As an alternative to the roller type support previously described, or in addition thereto, a loading device illustrated in FIGS. 12–15 may be used as an accessory. This device is mounted on the frame 10 by using a T-shaped link 70 pivotally mounted on an axle 72 between two ears 71 fixed to the frames. An arm 73 extending from the link 70 is fixed to a support platform 75. This platform may be built of a series of ribs 76 (FIG. 12) extending between rails 77 and preferably includes at least one roller 78 at the discharge end of the platform. These rollers assist in the discharge of a tire from the platform as will appear. Opposite the discharge end, the platform 75 includes a fence 79 on which the tire to be cut rests initially (FIG. 13) before lifting. The platform thus is hinged to the frame through the T-shaped link. This lift is useful with larger tires which can be rolled onto the fence 79 as shown in FIG. 13. A power device, shown as a hydraulic piston and cylinder 80 linked between the frame 10 and the link 70, then pushes the link 70 to tilt and lift the platform 75 to the position shown in FIG. 15. As the platform rises, the tire then slides off the platform—which sliding is eased by using the rollers 78. The tire slides into place ready to be cut, and may surround the holding post 40. In these figures, an alternative post 40' is shown. This latter post includes an overlapping portion 82 which is useful for holding smaller tires from tilting while being cut. In order to hold the large tires after they have slid off the platform 75, a pusher 83 in the form of a bracket having a triangular cross section is attached to the underside of the platform 75 at its discharge end. This pusher is activated from the main control and may be interlinked so that a renewed activation of the loading device causes operation of the pushers.

Means for disposal of cut pieces of the tire may also be desirable especially where the tire is a large one so that pieces are large, heavy and clumsy to be handled. Such a device is illustrated in FIGS. 16–19. This illustrated device is mounted on the frame 10 on the cutting side of the lower blade backing member 26 and its blade 25.

The discharge means is mounted to the frame on an axle 85 journalled in a series of bearing mounts 86 on the frame. A series of fingers 87 is fixed to the axle 85 and is adapted to rest in a receiving position (FIG. 17) where the fingers lie nearly horizontally adjacent the backing member 26 and beneath the location where the upper blade 28 will be cutting the tire. After each piece is cut, the finger 87 will be moved from the receiving position to a discharge position shown in FIG. 18. This lifting motion is caused by a hydraulic device 88 acting through a lever 89 to turn the axle 85. It will be apparent that any piece cut from a tire will fall on the fingers 87 and be lifted by those fingers and dumped to the side. A receptacle (not shown), which may be a bin or a conveyor belt, can be placed to receive the cut pieces to be carried away for disposal.

The hydraulic device 80 for loading and the device 88 for disposal may both be controlled from the control box 16 (FIGS. 1 and 2) so that the entire operation may be controlled by a single operator. It is envisioned that there will be an interlock between the main cutting operation and the disposal hydraulic device 88 so that the disposal will not operate while the shear is descending for the cut.

Figure 21:
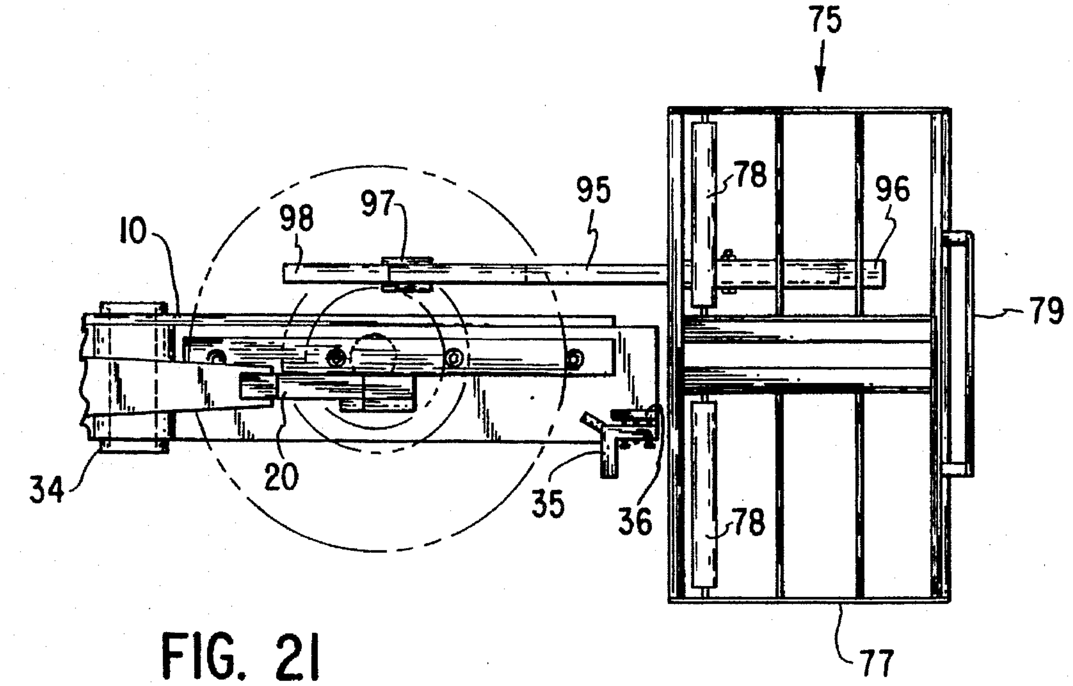
FIG. 21 is a top plan view of the parts shown in FIG. 20.
Figure 20:
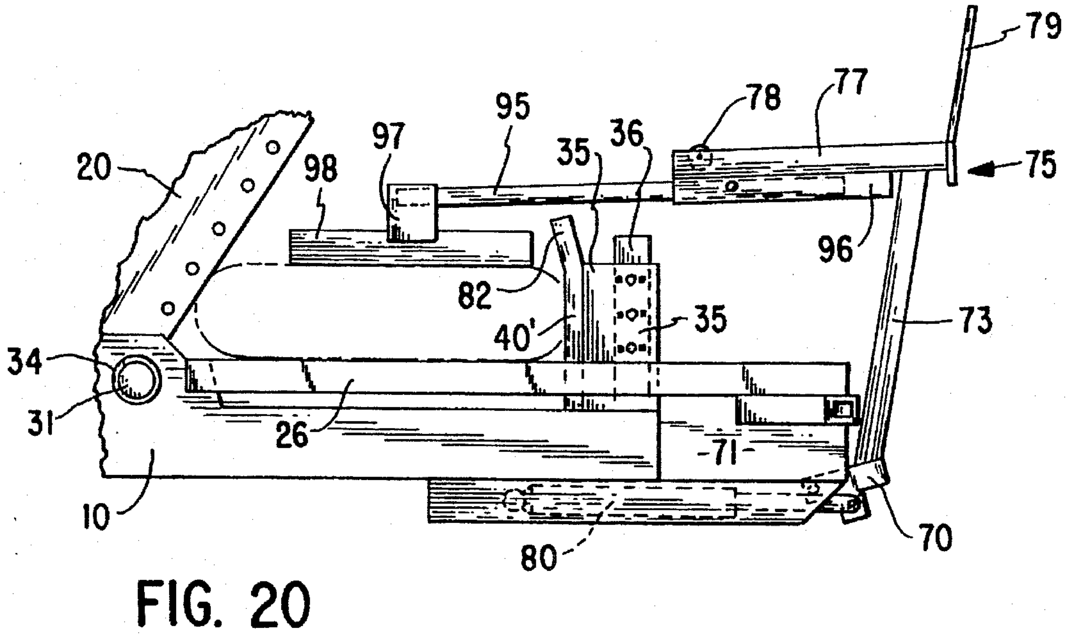
FIG. 20 is a side elevational view of the retaining device in use with the shear.

Added precautions may be necessary when cutting very large tires. Such tires have a tendency to roll or slide away from between the cutting blades making cutting difficult. To avoid the difficulty, this invention provides special holding means adapted to hold the tire in place. The holding means is shown in FIGS. 20 and 21.

The holding device may be independently operated or, as shown in the figures, may be operated by the loading device as shown in FIGS. 12–15. As described hereinbefore, this part of the cutter is designed for large tires and therefore is useful at the same time as the holding device. The holder is relatively simple and includes a support 95 which is telescoped into a socket 96 attached to the platform 75. At the end of the arm 95 remote from the socket 96, a bracket 97 holds a hold down bar 98. This assembly, as shown, is offset laterally from the cutting mechanism so as not to interfere with the cutting action, but to provide holding near to the blades doing the cutting.

The holder is illustrated with a relatively small tire where the bar 98 extends across most of the tire. It is also very useful for extremely large tires. The diameter of the wheel engaging portion of such tires might well be large enough to completely surround the post 40 or 40' and the overlapping portion 82, so that only the one circumference of casing is between the jaws or blades of the cutter. Thus, the bar 98 would engage only the one portion of the tire. In such a use, it is envisioned that the bracket 97 may be of adjustable length so as to accommodate various sizes as necessary.

In use, if the tire to be cut is very large, it is rolled onto the platform 79 in the down position (FIG. 13). The hydraulic cylinder mechanism 80 is then actuated to lift and tilt the tire. As it tilts, the tire eventually falls into place with one portion of the casing lying on the frame over the lower blade. The arm 95 can then be inserted into the socket 96 extending far enough so that the bar 98 is positioned over the casing. Added movement of the mechanism 80 is then effective to press the bar 98 hard enough against the casing to hold the tire as the blades do their work. Thus all tendency to roll or slide is resisted, and even the largest tire can be held in place while being cut.

Thus, a complete system for loading the machine, cutting the tire and disposing of cut pieces, even of the very largest tires, is provided by this device.

I claim as my invention:

1. A shearing device for cutting tires comprising a frame, lower shear blade means fixedly mounted on said frame, upper shear blade means including an upper blade support pivoted to a pivotal mounting on said frame, said upper shear blade means being in shearing relationship with said lower shear blade means thus forming a V-shaped opening between said upper and said lower shear blade means, said pivotal mounting defining a pivot axis substantially at the vertex of said V-shaped opening, said upper shear blade means also including an upper blade removably fixed to said upper blade support, power means including an expanding piston and cylinder assembly fastened at one end to said upper shear blade means and at the other end to said frame, said fastening of said other end to said frame being on said frame at a location remote from said pivot axis in a direction opposite to said V-shaped opening whereby said V-shaped opening is not obstructed by said piston and cylinder assembly, and outer guide means including upper guide means on said upper shear blade means remote from said pivot axis at an outer end of said upper blade, said upper guide means being positioned to be engaged with corresponding lower guide means on said lower shear blade means so that interaction between said upper guide means and said lower guide means prevents movement of said upper shear blade means laterally of said lower shear blade means, rollers mounted on said frame adjacent said lower shear blade means, said rollers being positioned to support said tire in position above said lower shear blade means, extendible supports mounted on said frame, at least a plurality of said rollers mounted on said extendible supports whereby said rollers may be extended and retracted for differing sizes of tires.

2. The shearing device of claim 1 in which said supports are telescopingly mounted on socket means on said frame.

* * * * *